United States Patent
Best et al.

(10) Patent No.: US 9,373,353 B2
(45) Date of Patent: Jun. 21, 2016

(54) NEGATIVE SELECT ACCESS MECHANISM

(71) Applicant: International Business Machines Corporation, Armonk, NY (US)

(72) Inventors: John S. Best, San Jose, CA (US); Steven R. Hetzler, Los Altos, CA (US); Drew Lawson, Aptos, CA (US); Daniel F. Smith, Felton, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/501,226

(22) Filed: Sep. 30, 2014

(65) Prior Publication Data

US 2016/0090240 A1 Mar. 31, 2016

(51) Int. Cl.
*G11B 17/12* (2006.01)
*G11B 17/22* (2006.01)
*G11B 17/18* (2006.01)

(52) U.S. Cl.
CPC .............. *G11B 17/225* (2013.01); *G11B 17/18* (2013.01); *G11B 17/228* (2013.01)

(58) Field of Classification Search
None
See application file for complete search history.

(56) References Cited

U.S. PATENT DOCUMENTS

| | | | |
|---|---|---|---|
| 5,379,229 A | 1/1995 | Parsons et al. | |
| 5,833,331 A * | 11/1998 | Chang | G06F 1/181 312/223.2 |
| 6,816,335 B2 * | 11/2004 | Hoelsaeter | G11B 15/6885 360/92.1 |
| 7,518,822 B1 * | 4/2009 | Karidis | G11B 15/6835 360/92.1 |
| 7,837,424 B2 | 11/2010 | Solomon | |
| 8,356,312 B2 * | 1/2013 | Takasawa | G11B 17/223 369/30.83 |
| 2004/0130819 A1 * | 7/2004 | Hoelsaeter | G11B 15/6885 360/92.1 |
| 2013/0290648 A1 | 10/2013 | Shao et al. | |

FOREIGN PATENT DOCUMENTS

WO 2006050616 A1 5/2006

OTHER PUBLICATIONS

Kahl, et al., "Treating Selections as Objects," IP.com, IPCOM000110335D, Prior Art Database Technical Disclosure, Nov. 1, 1992, pp. 1-4.
Tom, et al., "Triangulation Method to Locate an Object in the Gripper of a Manipulator," IP.com, IPCOM000054312D, Prior ARt Database Technical Disclosure, Jan. 1, 1980, pp. 1-3.

* cited by examiner

*Primary Examiner* — Carlos E Garcia
(74) *Attorney, Agent, or Firm* — Cantor Colburn LLP; Bryan Butler

(57) ABSTRACT

A technique for storage and retrieval of objects is provided. A holding structure is configured to hold the objects, and the objects are stored in the holding structure such that the objects can slide in and out of the holding structure. An elastic mechanism is at the back of the holding structure, and the elastic mechanism pushes the objects toward the front of the holding structure such that the objects are accessible at the front of the holding structure. A selector mechanism is positionable to push the objects that are adjacent to a selected object to be retrieved toward the back of the holding structure, and the selector mechanism exposes a portion of the selected object so that the selected object can be engaged at the exposed portion. A gripper is configured to engage the exposed portion of the selected object and pull the selected object from the holding structure.

15 Claims, 11 Drawing Sheets

FIG. 7

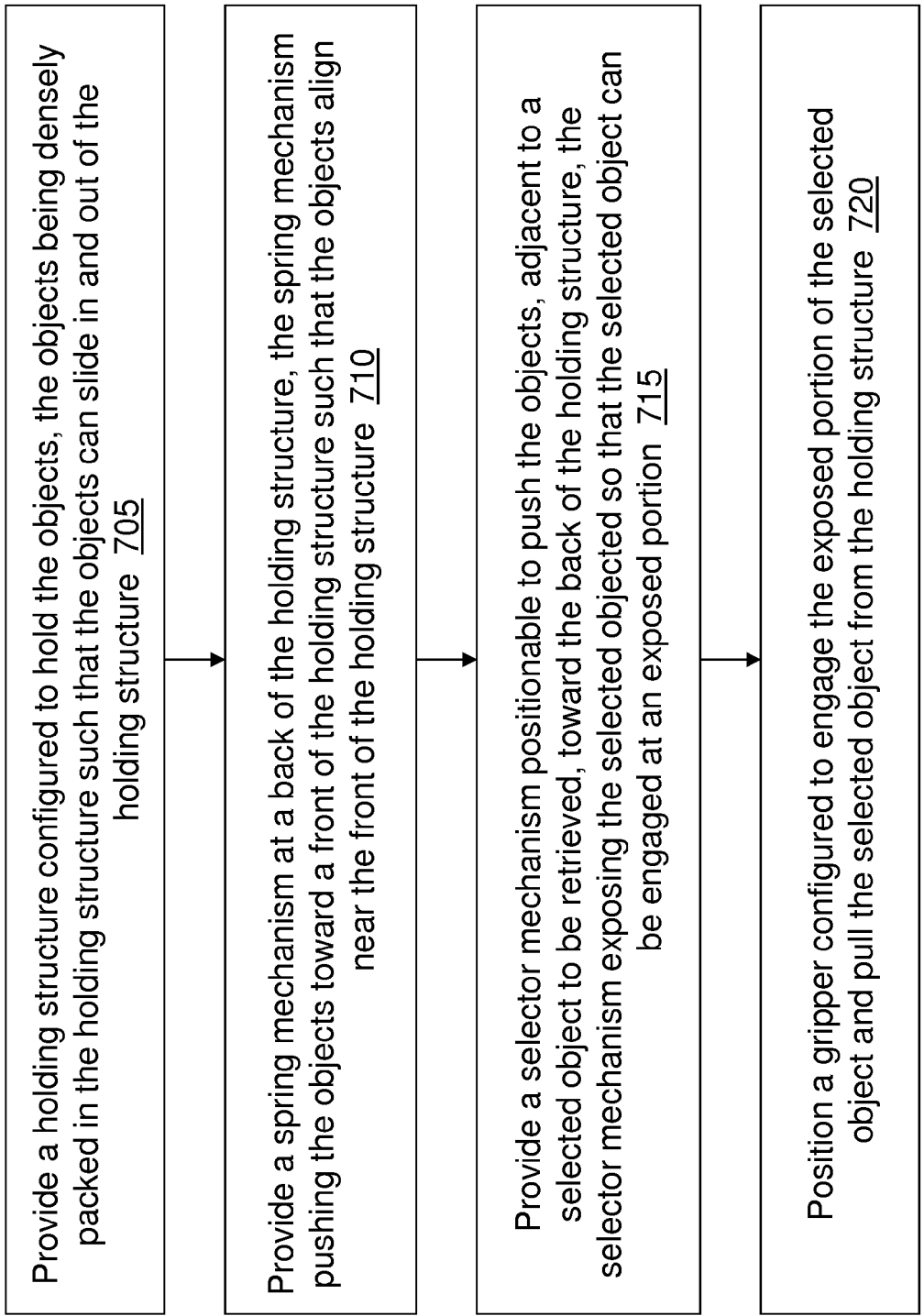

Provide a holding structure configured to hold the objects, the objects being densely packed in the holding structure such that the objects can slide in and out of the holding structure 705

↓

Provide a spring mechanism at a back of the holding structure, the spring mechanism pushing the objects toward a front of the holding structure such that the objects align near the front of the holding structure 710

↓

Provide a selector mechanism positionable to push the objects, adjacent to a selected object to be retrieved, toward the back of the holding structure, the selector mechanism exposing the selected objected so that the selected object can be engaged at an exposed portion 715

↓

Position a gripper configured to engage the exposed portion of the selected object and pull the selected object from the holding structure 720

NEGATIVE SELECT ACCESS MECHANISM

BACKGROUND

The present invention relates to a storage and retrieval system, and more specifically, to a negative select access mechanism for selecting and retrieving objects in the storage and retrieval system.

An automated storage and retrieval system (ASRS or AS/RS) consists of a variety of computer-controlled systems for automatically placing and retrieving loads from defined storage locations. Automated storage and retrieval systems (AS/RS) are typically used in applications where: there is a very high volume of loads being moved into and out of storage; storage density is important because of space constraints; and accuracy is critical because of potential expensive damage to the load.

AS/RS systems are designed for automated storage and retrieval of parts and items in manufacturing, distribution, retail, wholesale, and institutions. The systems operate under computerized control, maintaining an inventory of stored items. Retrieval of items is accomplished by specifying the item type and quantity to be retrieved. The computer determines where in the storage area the item can be retrieved from and schedules the retrieval. It directs the proper automated storage and retrieval machine (SRM) to the location where the item is stored and directs the machine to deposit the item at a location where it is to be picked up.

The equipment required for an AS/RS include the storage and retrieval machine (SRM) that is used for rapid storage and retrieval of material. SRMs are used to move loads vertically or horizontally, and can also move laterally to place objects in the correct storage location. Storage and retrieval machines pick up or drop off loads to the rest of the supporting transportation system at specific stations, where inbound and outbound loads are precisely positioned for proper handling.

SUMMARY

According to one embodiment, an apparatus for storage and retrieval of objects is provided. The apparatus includes a holding structure configured to hold the objects, and the objects are stored in the holding structure such that the objects can slide in and out of the holding structure. An elastic mechanism is at the back of the holding structure, and the elastic mechanism pushes the objects toward the front of the holding structure such that the objects accessible at the front of the holding structure. A selector mechanism is positionable to push the objects that are adjacent to a selected object to be retrieved toward the back of the holding structure, and the selector mechanism exposes at least a portion of the selected object so that the selected object can be engaged at the exposed portion. A gripper is configured to engage the exposed portion of the selected object and pull the selected object from the holding structure.

According to one embodiment, a method for storage and retrieval of objects is provided. The method includes providing a holding structure configured to hold the objects, and the objects are stored in the holding structure such that the objects can slide in and out of the holding structure. An elastic mechanism is provided at the back of the holding structure, and the elastic mechanism pushes the objects toward a front of the holding structure such that the objects are accessible at the front of the holding structure. A selector mechanism is positionable to push the objects that are adjacent to a selected object to be retrieved toward the back of the holding structure, and the selector mechanism exposes at least a portion of the selected object so that the selected object can be engaged at the exposed portion. A gripper is configured to engage the exposed portion of the selected object and pull the selected object from the holding structure.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

FIG. 7 illustrates a flow chart of a method for storage and retrieval of objects according to an embodiment.

DETAILED DESCRIPTION

Figure 1A:
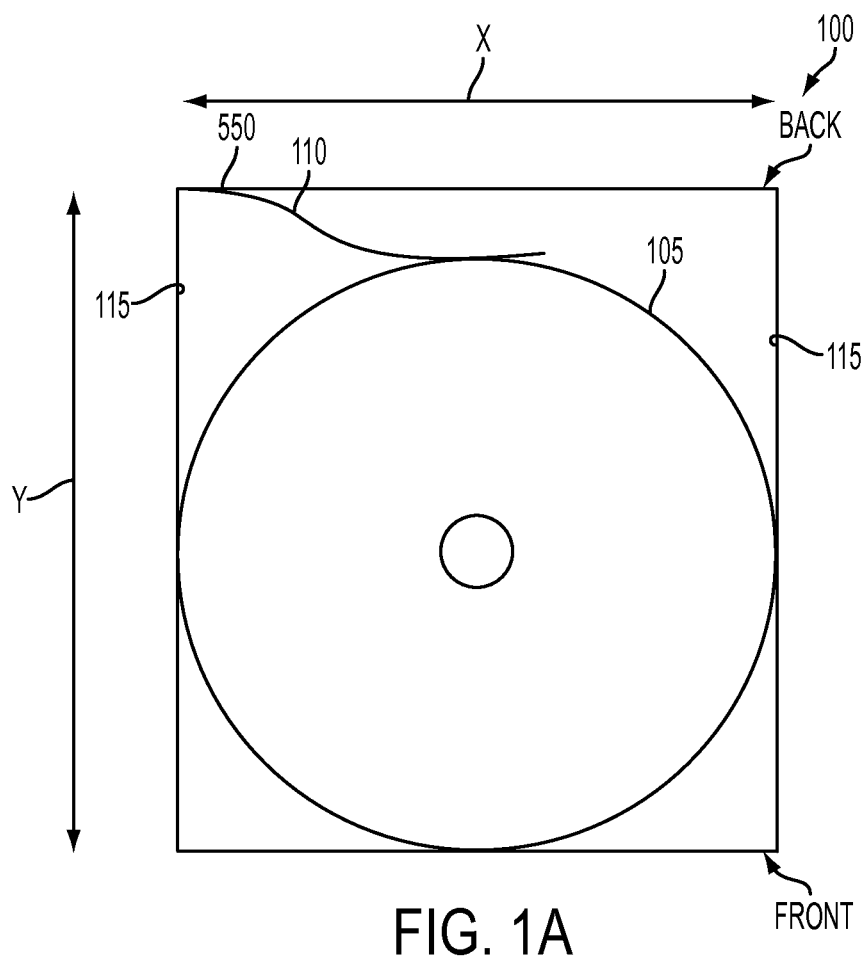
FIG. 1A illustrates a cross-sectional top view of a cartridge holding a plurality of disks according to an embodiment.

Robotic selection and retrieval of one of a large number of closely packed, physically identical objects is used in a number of commercially important storage facilities. Examples in information storage are magnetic tape and optical disk libraries. Ideal attributes of the storage mechanism provide for close packing of the object to be stored and retrieved, a simple and compact robotic mechanism to perform the retrieval, and rapid retrieval and replacement of the object.

Closely spaced, physically identical, featureless objects do not present a means for a robotic manipulator to attach to the object for retrieval or other movement operations. Featureless means that the objects do not have any added or formed gripping features/device for selection/retrieval. Some mechanism to separate a selected object from the adjacent, closely spaced objects is required. State-of-the-art mechanisms for retrieving on object from an array of closely spaced objects all have limitations.

Push selected object from behind with moveable device: One mechanism, commonly used in "jukebox" type devices pushes the selected object from behind the array of objects, so that it can be subsequently grabbed and manipulated by a robot mechanism at the front of the array of objects. The pusher mechanism needs to be actively controlled to align its position with the object to be selected, and to move the object with respect to the other objects in the array. This has the disadvantage of a high degree of complexity to have separate moving mechanisms at the front and back of the array of objects. Space must also be allocated for the pusher mechanism. As can be recognized herein, embodiments solve this problem with a passive, elastic mechanism that is simple and inexpensive to fabricate and does not require motors or other activation during operation.

Grip features embedded on or near the front of each object: This is not practical for many types of objects, such as, for example, in the case of selecting an optical storage disk from a stack of disks. As an example, there are notches molded into the sides of Linear Tape Open standard cartridges to enable robots to easily grip and move the tape cartridges between a storage location and a tape drive in a magnetic tape based information storage library. However, molding notches into or one optical storage disks would render the disks in operable.

Space the objects sufficiently far apart to allow a gripper mechanism to reach between the objects in order to pull the select object.

Stack objects and select by splitting and picking up all objects above the desired object, so that the desired object is either at the bottom or top of the split: Robotics to implement the sequence of steps to extract the desired object are slow and costly due to the compound motions required. In one approach used for optical disks, separate mechanisms, each with multiple dimensions of motion are used to remove the disk stack from a cover, insert a hub picker inside the center hole of the disk stack, lift the upper half of the stack, move the stack to the desired location, drop the selected disk, and replace the upper half of the stack.

According to embodiments, the disclosure provides a mechanism for exposing a grip surface that enables a robotic gripper to pull one object from the array of objects. This is accomplished by pushing back the objects on either side of the object to be selected. An elastic mechanism, or plurality of elastic mechanisms, positions the front of all objects in the same plane, facing the robot mechanism before the selection process begins and after an object has been replaced in the array. The robot gripper mechanism is arranged so that the robot gripper simultaneously pushes back objects adjacent to the selected object while positioning to engage the selected object with a gripper mechanism that is used to retrieve the selected object from the array of objects.

According to embodiments, the disclosure provides a mechanism comprising a plurality of closely spaced objects, a selector mechanism which pushes objects adjacent to one object to be selected, and a grabber/gripper mechanism to engage and remove the selected object that has been exposed by the selector mechanism.

Embodiments have substantial improvement in packing density, simplicity of mechanism, and access time over state-of-the-art systems.

Turning to the figures, FIG. 1A illustrates a cross-sectional top view of a cartridge 100 holding a plurality of disks 105 according to an embodiment. The cartridge 100 has an elastic mechanism, which may be one or more springs 110, providing a force against the disks 105. In one implementation, the springs 110 may be affixed (and/or mounted) to the back surface of the cartridge 100. In another implementation, the springs 110 may be mounted to a separate outer structure (e.g., outer structure 505 shown in FIG. 5A) to which the cartridge 100 can be inserted, such that springs 110 apply pressure to the disk 105 from the back of the cartridge 100. The compression of the springs 110 pushes the disks 105 toward the front of the cartridge 100 for selection and retrieval by a robot as discussed herein. Side wall guides 115 are positioned on the left and right sides of the cartridge 100 to individually hold the disks 105. Note that any structure having elasticity can be employed as the elastic mechanism. The elastic mechanism can be any structure or material that has the ability to resume its normal shape after being stretched or compressed.

Figure 1B:
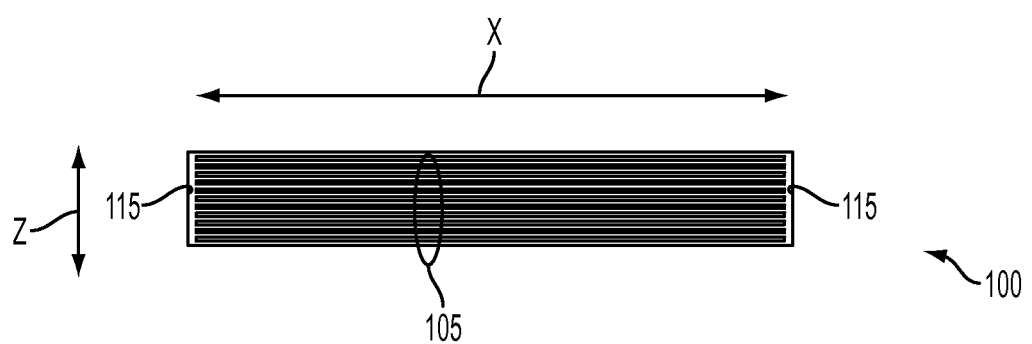
FIG. 1B illustrates a front view of the cartridge according to an embodiment.

FIG. 1B illustrates a front view of the cartridge 100 according to an embodiment. As can be seen, the side wall guides 115 serve as disk separators/slides to individually separate one disk 105 from another disk 105. Also, the elongated side wall guides 115 can hold the disks 105 in place even when no force is applied by the springs 110.

Figure 1C:
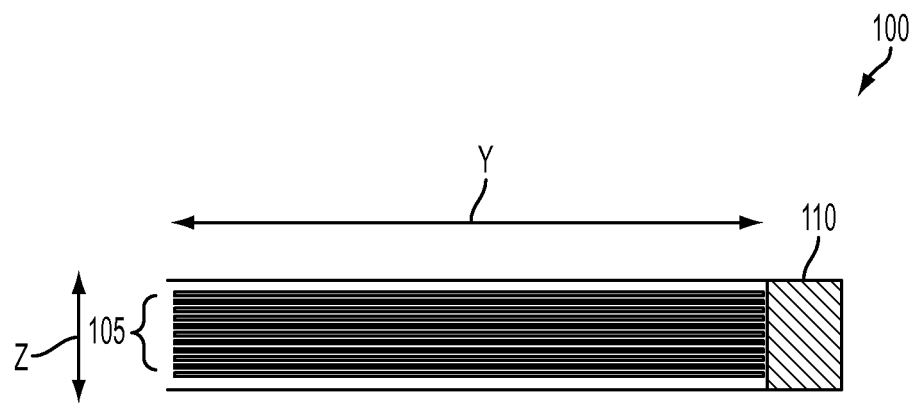
FIG. 1C illustrates a cross-sectional side view of the cartridge according to an embodiment.
Figure 1D:
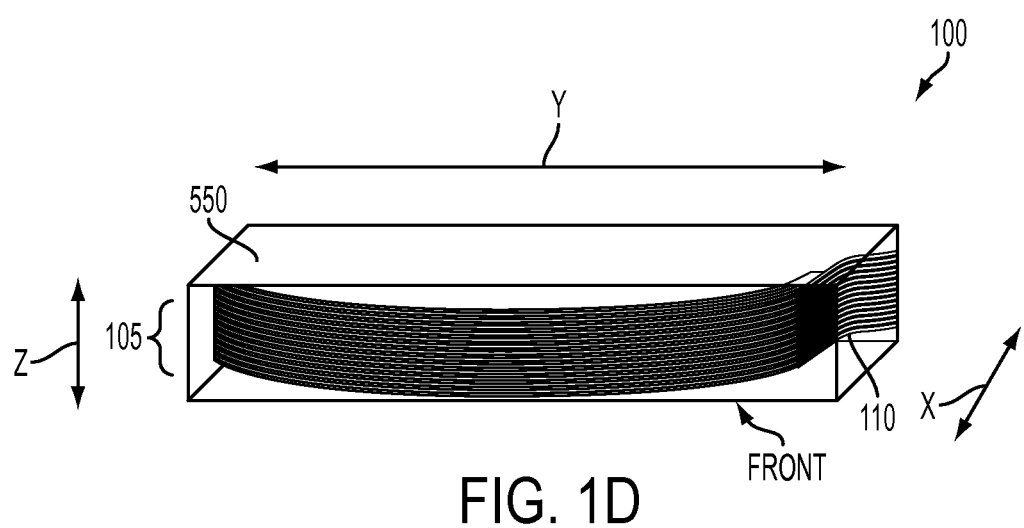
FIG. 1D illustrates an oblique view of the cartridge holding the disks according to an embodiment.

FIG. 1C illustrates a cross-sectional side view of the cartridge 100 according to an embodiment. According to an embodiment, FIG. 1D illustrates an oblique view of the cartridge 100 holding the disks 105, and one side of the cartridge 100 has been removed. In FIG. 1D, this implementation shows that the springs 110 (elastic mechanism) are individual spring fingers, where each individual finger is designed to contact and provide force on an individual disk 105 to push that individual disk 105 to the front of the cartridge 100. In another implementation, the spring 110 may be a single spring 110 designed to provide force simultaneously against all the disks 105 such that the disks 105 are collectively pushed toward the front of the cartridge 100.

FIGS. 2A through 2F illustrate the actions of the negative select and retrieval operation according to an embodiment. During the negative select and retrieval operation, there is a desired and selected disk 225 out of the disks 105. Examples show only one selected disk 225 that is being selected and retrieved, but more than one selected disk 225 can be selected and retrieved at a time.

Figure 2A:
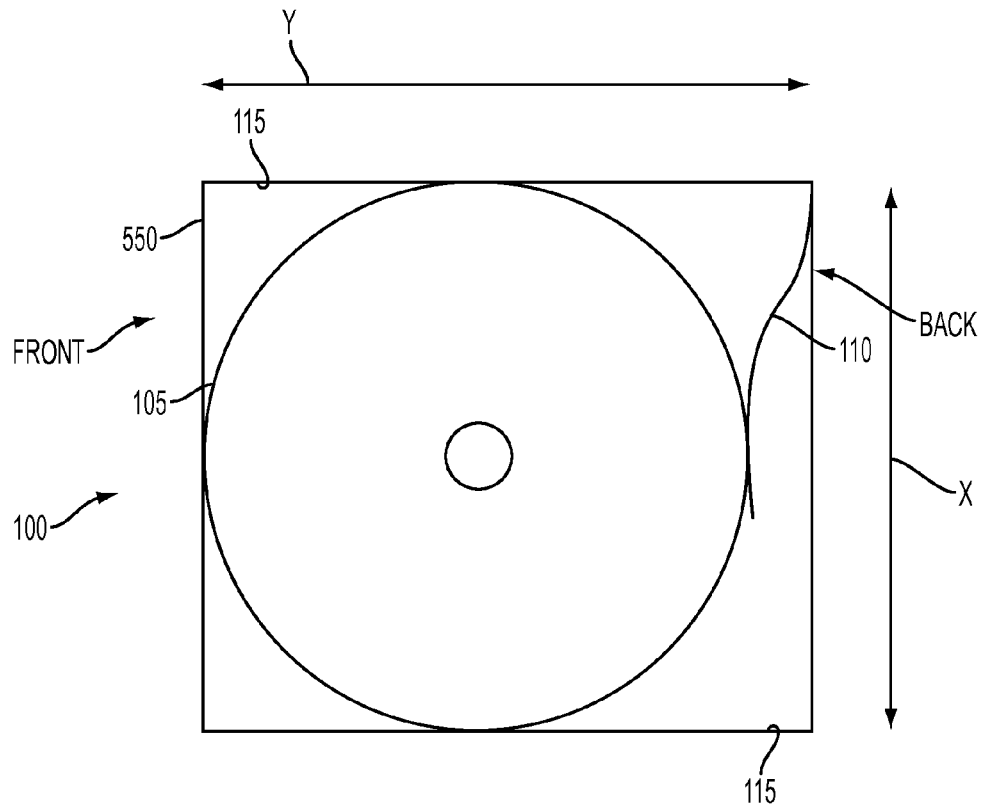
FIG. 2A illustrates a cross-sectional top view of a closely spaced stack of disks positioned by side wall guides according to an embodiment.

FIG. 2A is a cross-sectional top view of a closely spaced stack of disks 105, where the disks 105 are positioned by ribbed guides (of the side wall guides 115) in the side of the cartridge 100 (enclosure) holding the disks 105. The enclosure 100 may be an independent cartridge, as depicted in the figures. The frame 550 of the cartridge 100 may be a metal structure, polymer structure, and/or combination thereof that is similar to the state-of-the-art as understood by one skilled in art. A single spring or springs 110 are used to position and align the disks 105 toward the front of the cartridge 100. In FIG. 2A, no disk 105 has been selected.

Figure 2B:
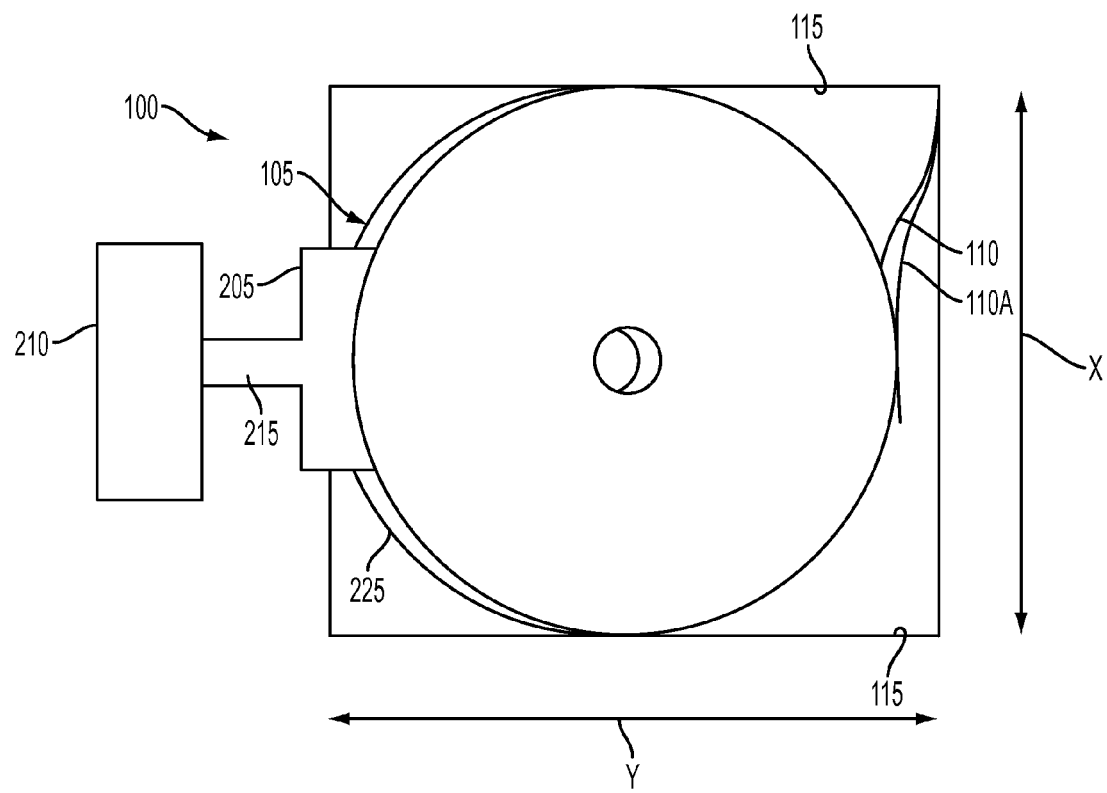
FIG. 2B illustrates a cross-sectional top view of the initial engagement by an integrated selector and gripper mechanism according to an embodiment.
Figure 2C:
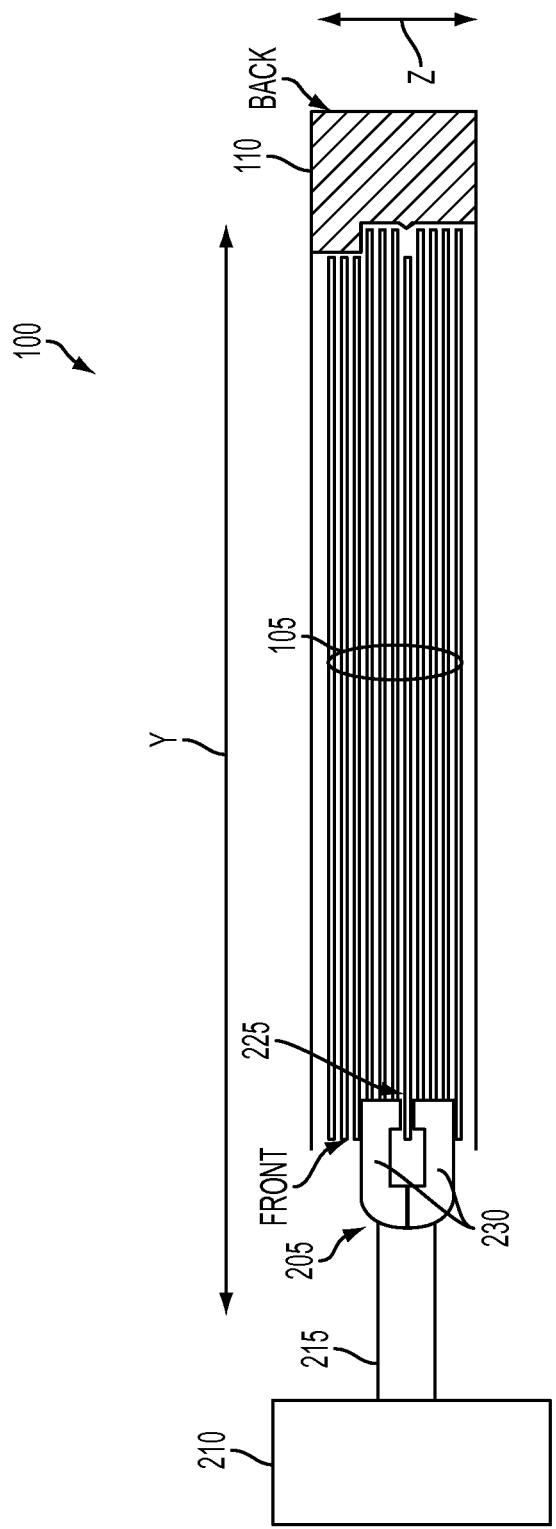
FIG. 2C illustrates a cross-sectional side view of the initial engagement by the integrated selector and gripper mechanism according to an embodiment.

FIG. 2B is a cross-sectional top view and FIG. 2C is the cross-sectional side view illustrating the initial engagement of an integrated selector and gripper mechanism 205 designed to push back adjacent disks 105 in order to expose the desired disk 225 (and later grab the selected disk 225) according to an embodiment. A robot 210 has a robotic arm 215 that is connected to the integrated selector and gripper mechanism 205. The robot 210 is designed to move and position itself in front of the desired stack of disks 105, as understood by one skilled in the art. This allows the desired disk 225 to be selected and retrieved. Once positioned in front of the desired disk 225 to be selected, the robotic arm 215 can be moved to engage (i.e., push) the adjacent disks 105 while not pushing back the desired disk 225.

The selector and gripper mechanism 205 is shaped (with a flat surface) and positioned to push back the disks 105 adjacent to the desired disk 225 to be selected when the selector and gripper mechanism 205 is inserted into the front of the cartridge 100. By selector and gripper mechanism 205 pushing back the adjacent disks 105, e.g., above and/or below the selected disk 225, respective springs 110A (applying force to the adjacent disks 105) are compressed such that the selected disk 225 is exposed. That is, the selected disk 225 is now extended outward (by the force of its spring 110) while the adjacent disks 105 have been pushed backward. The adjacent disks 105 have compressed springs 110A because of the pushing applied by the selector and gripper mechanism 205. As seen in FIG. 2C, the selector and gripper mechanism 205 may have two grippers 230. The grippers 230 may be (two) mechanical clamps with rubber on the tips that touch and grab the selected disk 225 from opposite sides. The grippers 230 may also incorporate polymer or soft metal (such as aluminum) clamps that grab the selected disk 225. The grippers 230 of the selector and gripper mechanism 205 are positioned on the top and bottom of the selected disk 225, and then the two grippers 230 are squeezed together to grip the selected disk 225 in preparation for retrieval.

Figure 2D:
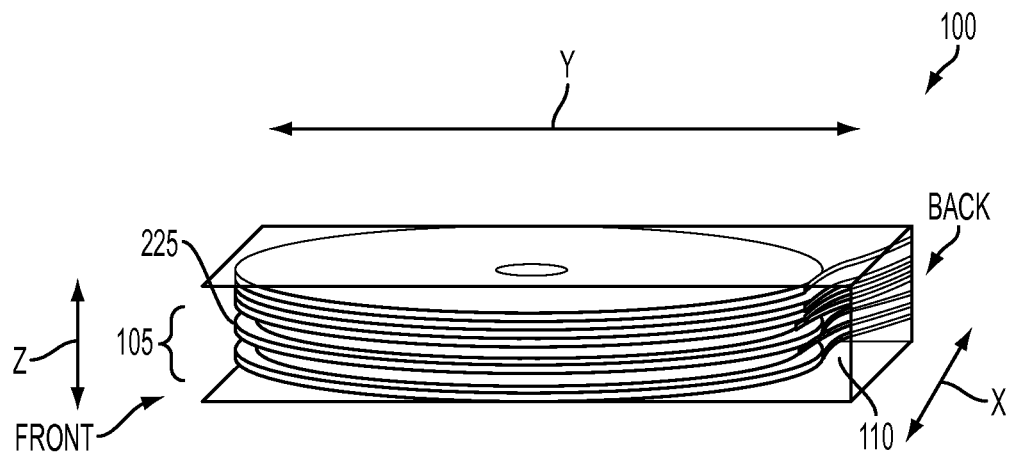
FIG. 2D is a schematic illustrating the position of the disks and springs during selection according to an embodiment.

FIG. 2D is a schematic illustrating the position of the disks 105 and springs 110 during selection. The robot 210 is omitted so as not to obscure the figure. As can be seen, the selected disk 225 is exposed, while the top and bottom adjacent disks 105 have been pushed backward.

Figure 2E:
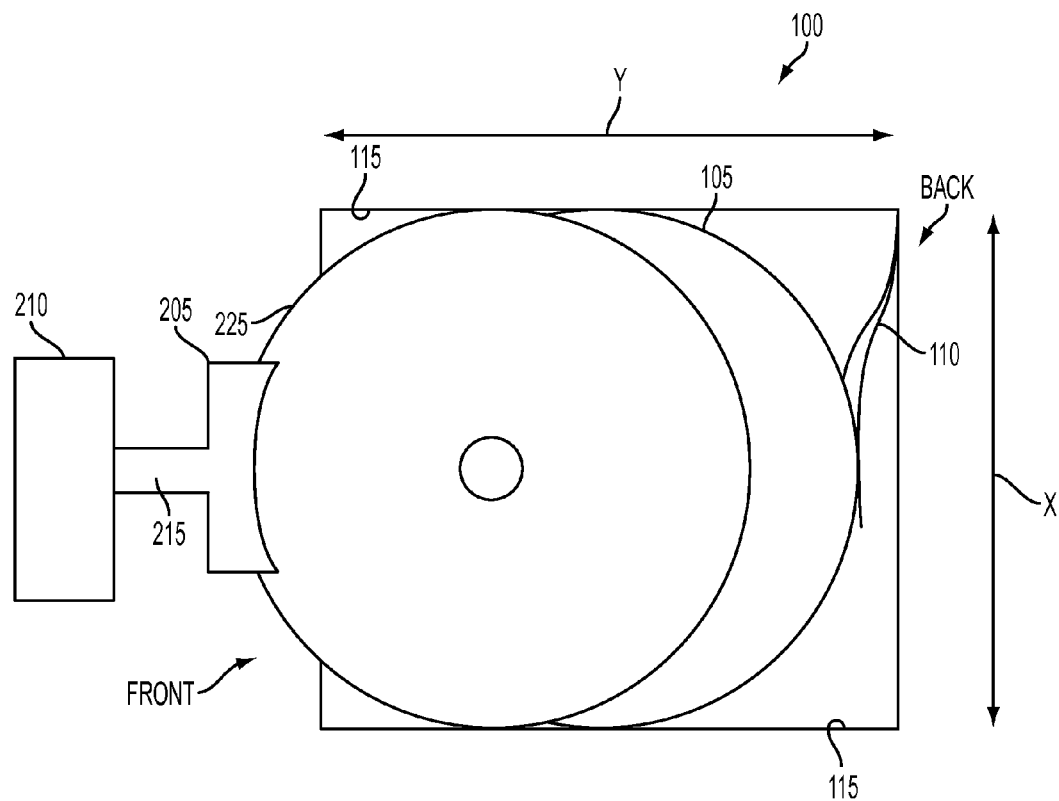
FIG. 2E illustrates a cross-sectional top view of retrieval of the selected disk according to an embodiment.
Figure 2F:
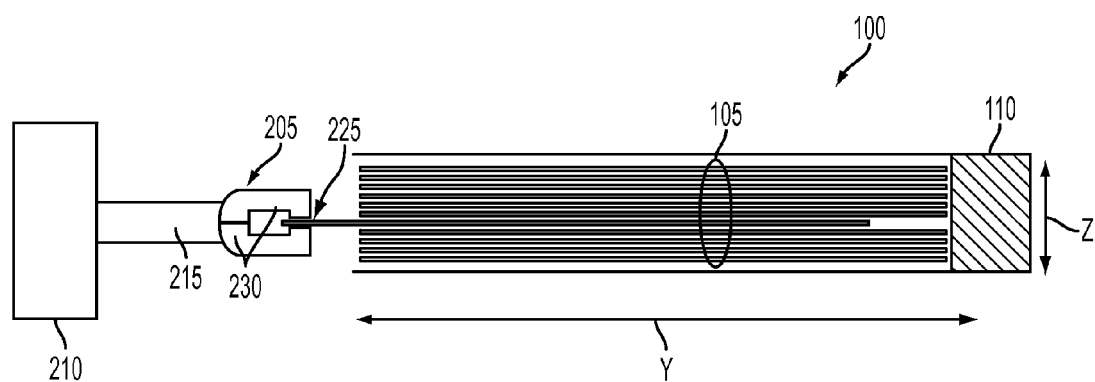
FIG. 2F illustrates a cross-sectional side view of retrieval of the selected disk according to an embodiment.

FIG. 2E is a cross-sectional top view and FIG. 2F is the cross-sectional side view illustrating retrieval of the selected disk 225 according to an embodiment. At this point, the selected disk 225 has been gripped by the grippers 230. Upon withdrawing the selector and gripper mechanism 205 (by the robot 210), only the selected disk 225 is removed from the cartridge 100. The springs 110 re-align the non-selected disks 105 (i.e., adjacent disks) again toward the front of the cartridge 100, as both the selector and gripper mechanism 205 and the selected disk 225 are removed (i.e., moved back from the stack of disks 105). At this point, the grippers 230 of the robot 210 have now retrieved the selected disk 225 (which is one of the disks 105), and is ready to take the selected disk 225 to the desired location, as understood by one skilled in the art. The selector and gripper mechanism 205 may be designed to select 1 and/or more than 1 disk 105 in a single operation.

Insertion of a disk 105 into an empty slot is accomplished by reversing this sequence. The gripper 230 of the robot 210 is first positioned to align the disk 105 with the empty slot. This can be accomplished with dead reckoning control of the robot position, by using feedback control based on optical or magnetic sensors detecting the alignment between the disk and empty slot, and/or by mechanical features at the slot that are engaged by the robot to provide precise alignment.

Unlike the state-of-the-art, embodiments disclose springs which position and align the disks, along with a selector and gripper mechanism which simultaneously pushes back disks adjacent to the selected disk and positions the gripper so that the gripper can clamp the selected disk from the top and bottom side in order to remove the selected disk.

Embodiments provide many features over the state-of-the-art. Embodiments can be scaled to structures holding very large numbers of disks and/or other objects. The elastic mechanisms are very inexpensive and can be batch fabricated along with the cartridge and/or larger structure holding the objects. A single robot managing the selector and gripper mechanism can select from an arbitrary large number of objects. Because selection and grip/retrieval can be integrated into a single, lightweight structure, and only the selected objects are moved a substantial distance, the speed of operation can be very fast.

In one implementation, the top and bottom gripper 230 may each have a front surface with a height of a few millimeters (mm) (e.g., (1 to 10 mm). The front surface of the top and bottom gripper 230 each about the top and bottom adjacent disks 105, respectively. The height of the top gripper 230 may be designed to only abut/push 1 adjacent disk 105 above the selected disk 225, and the height of the bottom gripper 230 may be designed to only abut/push 1 adjacent disk below the selected disk 225.

Figure 3:
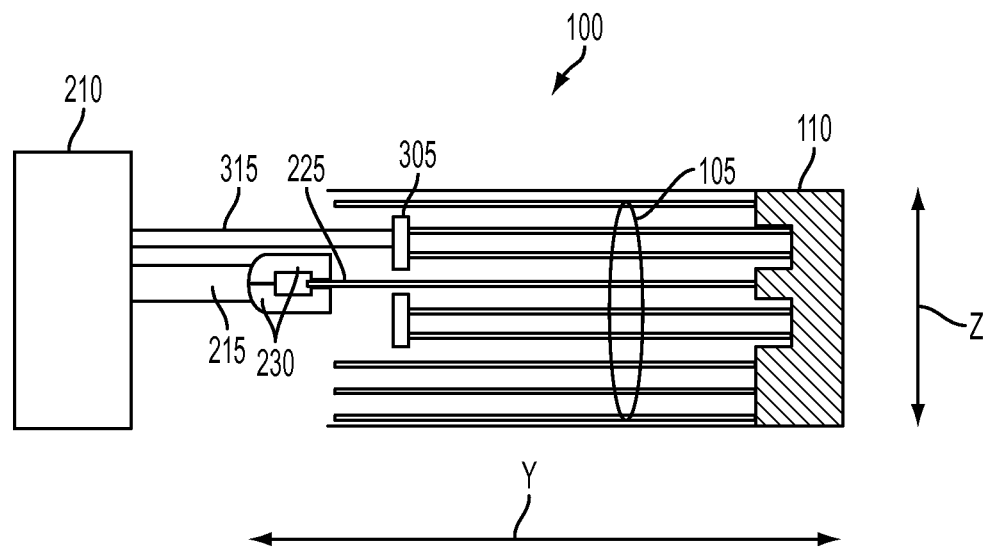
FIG. 3 illustrates a separate selector and separate gripper according to an embodiment.
Figure 4:
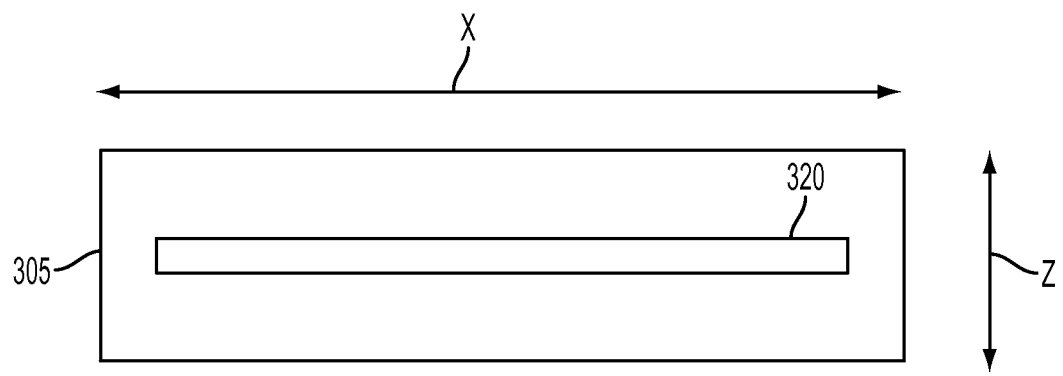
FIG. 4 illustrates a front view of the separate selector according to an embodiment.

Although the selector and gripper mechanism 205 may be an integrated device, FIG. 3 illustrates an example of a separate selector 305 and separate gripper 230 according to an embodiment. In this case, the selector 305 may be a plate with an opening 320 through which the selected disk 225 can extend through, as illustrated in FIG. 4. The selector 305 may be connected to a robotic arm 315. As the selector 305 pushes the adjacent disk 105 backward against their respective springs 100, the gripper 230 can grip (i.e., clamp down on) the selected disk 225. Once gripped, the gripper 230 can pull the selected disk 225 out of the cartridge 100 as discussed herein. FIG. 3 shows a side view of the selector (plate) 305 pushing the adjacent disks 105 against the spring 110. FIG. 4 shows a front view of the selector 305, while omitting the attachment of the selector robotic arm 315. There are many options for attaching the robotic arm 315. The selector robotic arm 315 may be attached above the opening 320 (as shown in FIG. 3), below the opening 320, to the left of the opening 320, to the right of the opening 320, and/or in any combination of two or more. The selector 305 may have a height of a few millimeters (1 to 5 mm) and a width that is a fraction of the diameter of a disk (1 to 50 mm). The selector 305 may be a metal, polymer, and/or combination thereof.

Figure 5A:
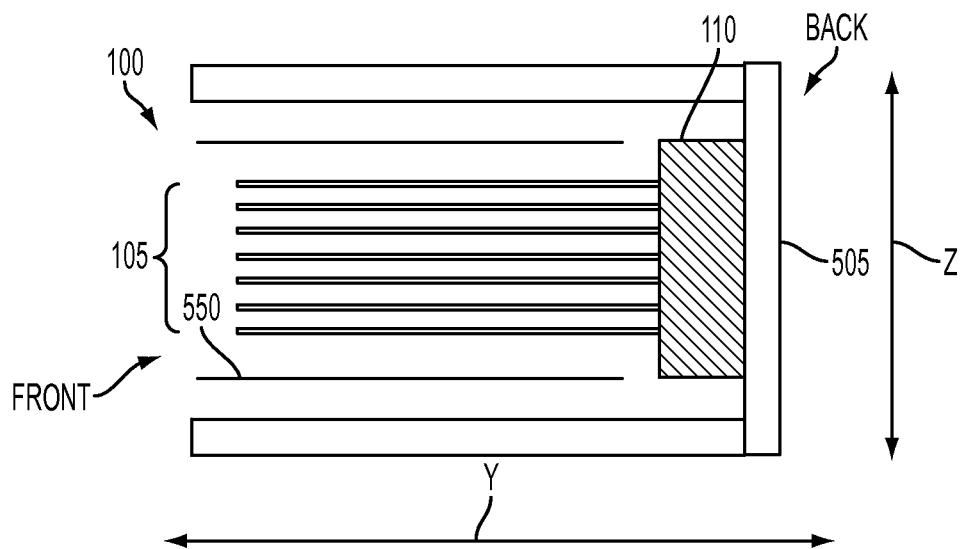
FIG. 5A illustrates mounting the springs to an outer structure according to an embodiment.
Figure 5B:
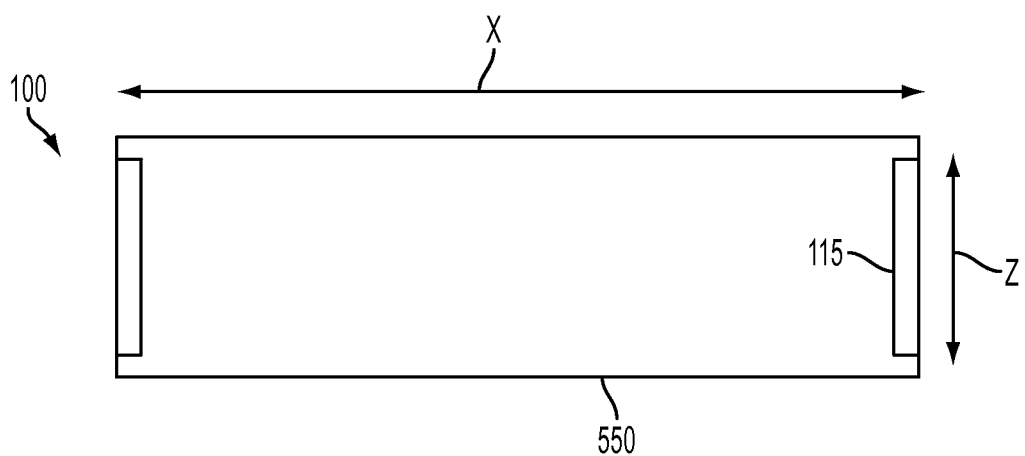
FIG. 5B illustrates a front view of the frame of the cartridge according to an embodiment.

Although the springs 110 may be mounted to the back of the cartridge 100, FIG. 5A illustrates an example in which the springs 110 are mounted to an outer structure 505, and the springs 110 are positioned behind the cartridge 100. In this case, the springs 110 are not mounted to the cartridge frame 550 of the cartridge 100. In this implementation, the cartridge frame 550 is open in both the front and back. The opening in the front allows the disks 105 to be inserted and retrieved. The opening in the back allows the springs 110, mounted on the outer structure 505, to contact the disks 105. As discussed herein, the springs 110 apply force to the disks 105 in order to align the disks 105 to the front of the cartridge 100. FIG. 5A shows that the frame 550 of the cartridge 100 is not utilized to mount the springs 110. FIG. 5B is a front view of the cartridge frame 550 of the cartridge 100 with no disks 105 present. The frame 550 is shown with a top, bottom, left side, and right side. The top and bottom of the frame 550 may be recessed such that the selector and gripper mechanism 205 does not contact the top of the frame 550 when selecting/gripping a top most disk 105 and does not contact the bottom of the frame 550 when selecting/gripping a bottom most disk 105. The recess may be a curve, indent, and/or depression (in the top and bottom of the frame 550) greater than the clearance needed from the selector and gripper mechanism 205.

Figure 6:
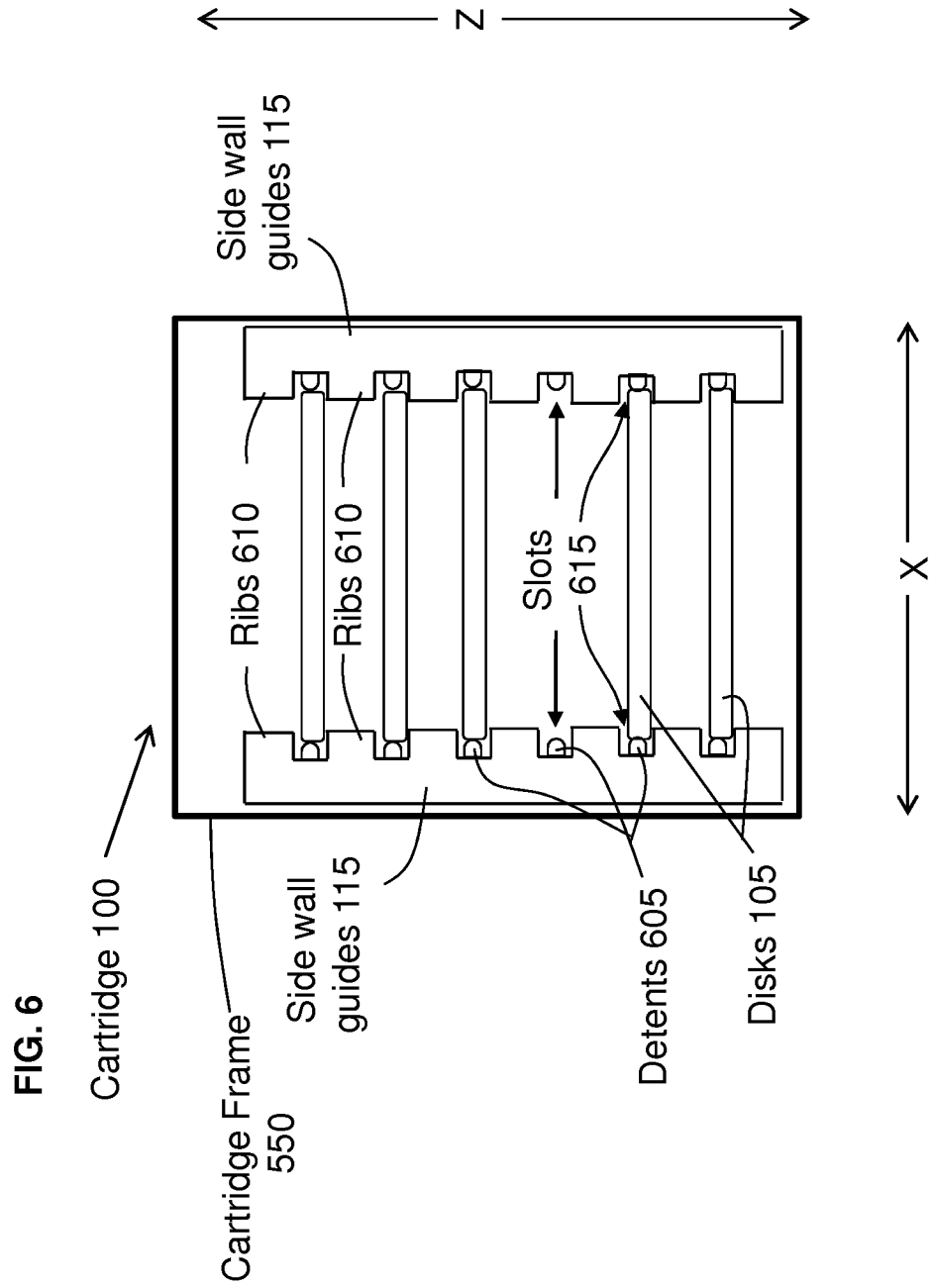
FIG. 6 illustrates an enlarged view of the side wall guides according to an embodiment.

FIG. 6 illustrates an enlarged view of the side wall guides 115 according to an embodiment. FIG. 6 is not drawn to scale and intentionally exaggerates the spacing between disks 105 (in the z plane) for ease of understanding and not limitation. The actual spacing between each disk 105 is less than the thickness of a single disk 105. In one case, the disk 105 may have a thickness of 1.2 mm (which is the current standard) and the spacing between the disks 105 is less than 1.2 mm (e.g., less than 1 mm). The side wall guides 115 comprise ribs 610 that form slots 615 into which the disks 105 are held. Each of the slots 615 have detents 605 extending from the sides. The detents 605 provide (additional) friction to hold the disks 105 in place against the compression of the springs 110, and also when the spring 110 is not applying force against the disk 105. In one implementation, there can be a single spring 110 simultaneously pressing against all the disks 105. When the selector and gripper mechanism 205 presses against the adjacent disks 105 (thereby compressing the single spring 105), the disks 105 that are not adjacent to the selected disk 225 have no force applied from the back by the single spring 105 because the single spring 105 has been compressed. In this case, the detents 105 have friction (and/or press against the edges of the disk 105) to hold the non-adjacent disks 105 in place when no force is pressed against the back of the non-adjacent disks 105. As recognized herein, the adjacent disks 105 are one or more disks immediately above and/or below the selected disk 225, and the adjacent disks 105 are pressed backward by the selector and gripper mechanism 205 in order to expose the selected disk 225.

Now turning to FIG. 7, a flow chart 700 of a method for storage and retrieval of objects is provided according to an embodiment. The objects may be the disks 105. Also, the objects may be other items suitable for selection and retrieval as discussed herein. Examples of the different types of objects include optical disks. The optical disks may comprise compact discs (CD), compact discs read only memory (CD-ROM), digital versatile disc (DVD), Blu-ray discs, BD-XL (Blu-ray discs with triple layer and quadruple layers), and/or Blu-ray follow-on discs (such as Blu-ray discs that follow Blu-ray standards with additional capacity), all of which can be in read-only, write-once, or read/write versions of the respective optical storage technology. Reference can be made to FIGS. 1-6 discussed herein.

At block 705, a holding structure (e.g., cartridge 100) configured to hold the objects (e.g., disks 105) is provided, where the objects are densely packed in the holding structure 100 such that the objects 105 can slide in and out of the holding structure 100. The objects 105 can be spaced apart (i.e., densely packed) according to the height of the ribs 610 that hold and separate one object 105 from another object 105, as shown in FIG. 6. If the height of the ribs 610 is 0.5 millimeter (mm), then the objects can be each spaced apart by 0.5 mm. In such a case, the respective height of the top and bottom gripper 230 can each be in the range between 0.5 mm through several millimeters (e.g., 5, 6, 7, 8 mm, etc.). Also, the spacing of the objects 105 can be less than the thickness of each object 105.

At block 710, an elastic mechanism (e.g., spring 110) is positioned at the back of the holding structure 100, where the elastic mechanism 110 pushes the objects 105 toward the front of the holding structure 100 such that the objects 105 align near the front of the holding structure 100. By having the objects 105 pushed to the front of the holding structure 100, this provides easy access for the selector 305 and/or selector and gripper mechanism 205.

At block 715, a selector mechanism (e.g., the selector 305 and/or selector and gripper mechanism 205) positionable to push the objects 105 adjacent to a selected object 225 to be retrieved toward the back of the holding structure is provided, where the selector mechanism exposes the selected object 225 so that the selected object can be engaged at an exposed portion.

At block 720, the gripper 230 is configured to engage the exposed portion of the selected object and pull the selected object from the holding structure 100.

In one implementation, the selector mechanism (e.g., selector and gripper mechanism 205) comprises the gripper 230 that engages the selected object by gripping the exposed portion.

The elastic mechanism may be a single spring 110 positioned to push the objects to the front of the holding structure 100. The holding structure comprises side wall guides 115 designed to individually hold the objects 105 in the holding structure 10. The side wall guides 115 provide friction to hold the objects 105 in place when the objects are not pushed back by the selector mechanism (e.g., the selector 305 and/or selector and gripper mechanism 205) but the single spring 110 has been compressed. The single spring 110 comprises a compliant material. A complaint material may be joint less (single-piece) material which is flexible and able to transfer mechanical forces through its rigid-body. A compliant material can flex/compress and then return to its original shape. The compliant material of the single spring is at least one of a metal spring, a polymer spring, a compliant rubber, a compliant foam, and/or a coil spring with push a plate.

In another case, the elastic mechanism 110 comprises individual springs 110 separately pushing each of the objects (on a one-to-one basis) toward the front of the holding structure 100. The individual springs 110 are at least one of metal springs, polymer springs, compliant rubber, and compliant foam.

The objects are optical disks 105. The optical disks 105 comprise at least one of compact discs (CD), compact discs read only memory (CD-ROM), digital versatile disc (DVD), and Blu-ray discs. The holding structure is the cartridge 100 that holds the optical disks 105, and the cartridge has side wall guides 115 arranged to guide and separate the optical disks 105. The cartridge 100 integrates/comprises the springs 110 as the elastic mechanism, such that the springs 110 push the optical disks toward the front of the cartridge 100.

In one case, the holding structure is the cartridge 100 that holds the optical disks 105, and the cartridge is inserted in an outer structure 505. The springs 110 of the elastic mechanism are attached to the outer structure 506, as shown in FIG. 5A. The outer structure 506 may be a metal rack with a back plate that supports the attached springs 110. The outer structure 506 may have sides that receive one or more cartridges 100. The outer structure 506 may be utilized even when the springs 110 are attached to and integrated in the cartridge 100 itself, and the cartridge 100 can be placed both vertically and horizontally in the outer structure 506 as understood by one skilled in the art.

The holding structure 100 comprises side wall guides 115 that hold the optical disks 105, and the elastic mechanism comprises springs 110 that individually apply force to the optical disks 105. The side wall guides 115 comprise detents 605 that individually locate and retain the optical disks 105 when there are variations in the force applied by springs on the optical disks, as shown in FIG. 6.

The selector mechanism (e.g., integrated selector and gripper mechanism 205 and/or separate selector 305) is configured to select the selected object 225 one at a time. Additionally and/or alternatively, the selector mechanism (e.g., integrated selector and gripper mechanism 205 and/or separate selector 305) is configured to select a plurality of selected objects 105 at a time.

Figure 8:
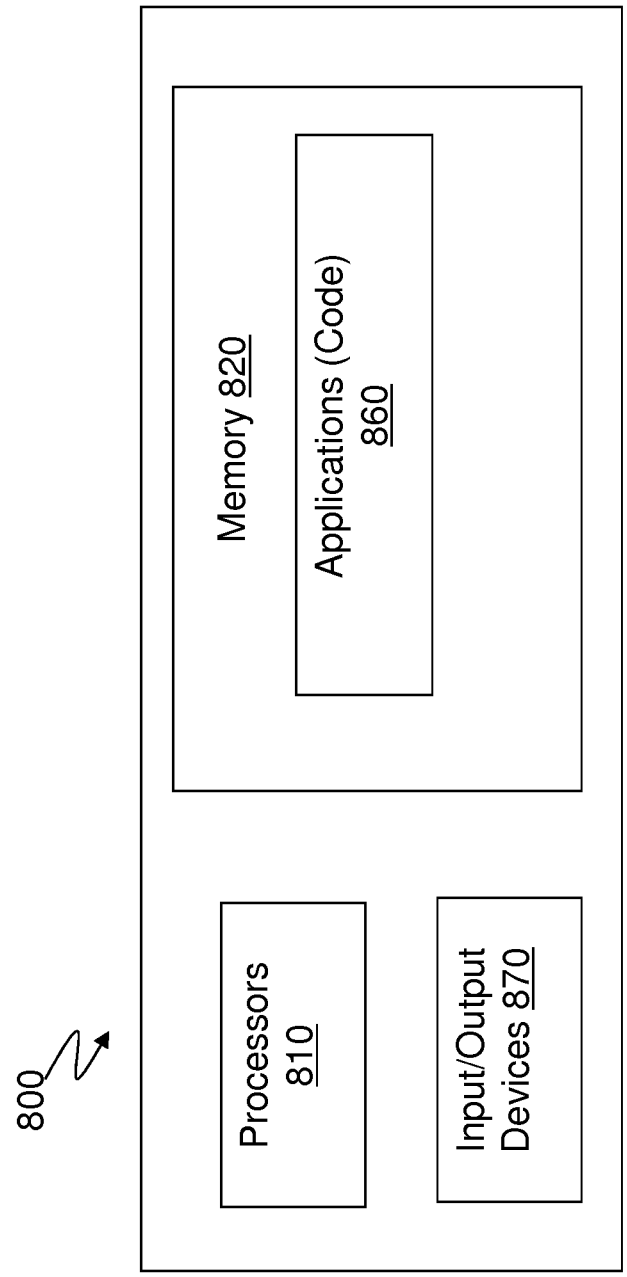
FIG. 8 illustrates an example of a computer having capabilities which may be included in and/or connected to embodiments.

FIG. 8 illustrates an example of the computer 800 having capabilities, which may be included in exemplary embodiments. Various methods, procedures, circuits, elements, and techniques discussed herein may incorporate and/or utilize the capabilities of the computer 800. One or more of the capabilities of the computer 800 may be utilized to implement, to incorporate, to connect to, and/or to support any element discussed herein (as understood by one skilled in the art) in FIGS. 1-7. For example, the robot 210 may incorporate any of the hardware and software features discussed in FIG. 12. The robot 210 may be run by the computer 800 and/or include the computer 800. Applications 860 of the computer 800 have control to position (move) the robot 210, robotic arm 215, selector and gripper mechanism 205, gripper 230, selector robotic arm 315, and selector 305 as discussed herein.

Generally, in terms of hardware architecture, the computer 800 may include one or more processors 810, computer readable storage memory 820, and one or more input and/or output (I/O) devices 870 that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 810 is a hardware device for executing software that can be stored in the memory 820. The processor 810 can be virtually any custom made or commercially available processor, a central processing unit (CPU), a data signal processor (DSP), or an auxiliary processor among several processors associated with the computer 800, and the processor 810 may be a semiconductor based microprocessor (in the form of a microchip) or a microprocessor.

The computer readable memory 820 can include any one or combination of volatile memory elements (e.g., random access memory (RAM), such as dynamic random access memory (DRAM), static random access memory (SRAM), etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 820 may incorporate electronic, magnetic, optical, and/or other types of storage media. Note that the memory 820 can have a distributed architecture, where various components are situated remote from one another, but can be accessed by the processor 810.

The software in the computer readable memory 820 may include one or more separate programs, each of which comprises an ordered listing of executable instructions for implementing logical functions. The software in the memory 820 includes one or more applications 860 of the exemplary embodiments. As illustrated, the application 860 comprises numerous functional components for implementing the features, processes, methods, functions, and operations of the exemplary embodiments. The application 860 of the computer 800 may represent numerous applications, agents, software components, modules, interfaces, controllers, etc., as discussed herein but the application 860 is not meant to be a limitation.

The application 860 may be an executable program (object code), script, or any other entity comprising a set of instructions to be performed. Furthermore, the application 860 can be written as (a) an object oriented programming language, which has classes of data and methods, or (b) a procedure programming language, which has routines, subroutines, and/or functions.

The I/O devices 870 may include input devices (or peripherals) such as, for example but not limited to, a mouse, keyboard, scanner, microphone, camera, etc. Furthermore, the I/O devices 870 may also include output devices (or peripherals), for example but not limited to, a printer, display, etc. Finally, the I/O devices 870 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 870 also include components for communicating over various networks, such as the Internet or an intranet. The I/O devices 870 may be connected to and/or communicate with the processor 810 utilizing Bluetooth connections and cables (via, e.g., Universal Serial Bus (USB) ports, serial ports, parallel ports, FireWire, HDMI (High-Definition Multimedia Interface), etc.).

When the computer 800 is in operation, the processor 810 is configured to execute software stored within the memory 820, to communicate data to and from the memory 820, and to generally control operations of the computer 800 pursuant to the software.

When the application 860 is implemented in software, it should be noted that the application 860 can be stored on virtually any computer readable storage medium for use by or in connection with any computer related system or method. The application 860 can be embodied in any computer-readable medium for use by or in connection with an instruction execution system, apparatus, server, or device, such as a computer-based system, processor-containing system, or other system that can fetch the instructions from the instruction execution system, apparatus, or device and execute the instructions.

In exemplary embodiments, where the application 860 is implemented in hardware, the application 860 can be implemented with any one or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. An apparatus for storage and retrieval of optical disks, the apparatus comprising:
   a holding structure configured to hold the optical disks, the optical disks being stored in the holding structure such that the optical disks can slide in and out of the holding structure;
   an elastic mechanism at a back of the holding structure, the elastic mechanism pushing the optical disks toward a front of the holding structure such that the optical disks are accessible from the front of the holding structure;
   a selector mechanism positionable to push the optical disks that are adjacent to a selected optical disk to be retrieved toward the back of the holding structure, the selector mechanism exposing at least a portion of the selected optical disk so that the selected optical disk can be engaged at the exposed portion; and
   a gripper configured to engage the exposed portion of the selected optical disk and pull the selected optical disk from the holding structure;
   wherein the optical disks are circular.

2. The apparatus of claim 1, wherein the selector mechanism comprises the gripper.

3. The apparatus of claim 1, wherein the optical disks comprise at least one of compact discs (CD), compact discs read only memory (CD-ROM), digital versatile disc (DVD), Blu-ray discs (BD), Blu-ray discs-XL discs, and Blu-ray follow-on discs;
   wherein the optical disks comprise at least one of read-only, write-once, and read/write versions.

4. The apparatus of claim 1, wherein the holding structure is a cartridge that holds the optical disks, the cartridge being inserted in an outer structure;
   wherein springs of the elastic mechanism are attached to the outer structure.

5. The apparatus of claim 1, wherein the holding structure comprises side wall guides that hold the optical disks;
   wherein the elastic mechanism comprises springs that individually apply force to the optical disks,
   wherein the side wall guides comprise detents that individually locate and retain the optical disks when there are variations in the force applied by the springs on the optical disks.

6. The apparatus of claim 1, wherein the selector mechanism is configured to select the selected optical disk one at a time.

7. The apparatus of claim 1, wherein the selector mechanism is configured to select a plurality of selected optical disk at a time.

8. The apparatus of claim 1, wherein the elastic mechanism is a single spring positioned to push the optical disks to the front of the holding structure.

9. The apparatus of claim 8, wherein the holding structure comprises side wall guides designed to individually hold the optical disks in the holding structure;
   wherein the side wall guides provide friction to hold the optical disks in place when the optical disks are not pushed by the selector mechanism.

10. The apparatus of claim 8, wherein the single spring comprises a compliant material;
    wherein the compliant material of the single spring is at least one of a metal spring, a polymer spring, a compliant rubber, a compliant foam, and a coil spring with a push plate.

11. The apparatus of claim 1, wherein the elastic mechanism comprises individual springs separately pushing each of the optical disks toward the front of the holding structure.

12. The apparatus of claim 11, wherein the individual springs are at least one of metal springs, polymer springs, compliant rubber, and compliant foam.

13. An apparatus for storage and retrieval of objects, the apparatus comprising:
    a holding structure configured to hold the objects, the objects being stored in the holding structure such that the objects can slide in and out of the holding structure;
    an elastic mechanism at a back of the holding structure, the elastic mechanism pushing the objects toward a front of the holding structure such that the objects are accessible from the front of the holding structure;
    a selector mechanism positionable to push the objects that are adjacent to a selected object to be retrieved toward the back of the holding structure, the selector mechanism exposing at least a portion of the selected object so that the selected object can be engaged at the exposed portion; and
    a gripper configured to engage the exposed portion of the selected object and pull the selected object from the holding structure;
    wherein the objects are optical disks;
    wherein the holding structure is a cartridge that holds the optical disks, the cartridge having side wall guides arranged to guide and separate the optical disks;
    wherein the cartridge integrates springs as the elastic mechanism, such that the springs push the optical disks toward the front of the cartridge.

14. A method for storage and retrieval of objects, the method comprising:
    providing a holding structure configured to hold the objects, the objects being stored in the holding structure such that the objects can slide in and out of the holding structure;
    providing an elastic mechanism at a back of the holding structure, the elastic mechanism pushing the objects toward a front of the holding structure such that the objects are accessible from the front of the holding structure;
    providing a selector mechanism positionable to push the objects that are adjacent to a selected object to be retrieved toward the back of the holding structure, the selector mechanism exposing at least a portion of the selected object so that the selected object can be engaged at the exposed portion;
    positioning a gripper configured to engage the exposed portion of the selected object and pull the selected object from the holding structure;
    wherein the objects are optical disks;

wherein the holding structure is a cartridge that holds the optical disks, the cartridge having side wall guides arranged to guide and separate the optical disks;

wherein the cartridge integrates springs as the elastic mechanism, such that the springs push the optical disks toward the front of the cartridge.

15. The method of claim 14, wherein the selector mechanism comprises the gripper.

* * * * *